United States Patent
Nishizaki et al.

[11] Patent Number: 6,022,910
[45] Date of Patent: Feb. 8, 2000

[54] HOT-MELT SOLID INK COMPOSITION

[75] Inventors: Masahiro Nishizaki; Naomichi Kobayashi, both of Nagoya, Japan

[73] Assignee: Brother Kogyo Kabushiki Kaisha, Nagoya, Japan

[21] Appl. No.: 08/975,861

[22] Filed: Nov. 21, 1997

[30] Foreign Application Priority Data

Nov. 21, 1996 [JP] Japan ................................. 8-310757
Mar. 31, 1997 [JP] Japan ................................. 9-094511

[51] Int. Cl.⁷ .................................................. C09D 11/10
[52] U.S. Cl. ........................ 523/161; 524/275; 524/277; 524/477; 524/478; 524/487; 524/488
[58] Field of Search ............................. 523/761; 524/275, 524/277, 477, 478, 487, 488; 106/31.29

[56] References Cited

U.S. PATENT DOCUMENTS

| | | |
|---|---|---|
| 3,413,250 | 11/1968 | Varron et al. |
| 3,653,932 | 4/1972 | Berry et al. ............ 106/31.29 |
| 4,390,369 | 6/1983 | Merritt et al. ............ 106/31.3 |
| 4,659,383 | 4/1987 | Lin et al. ............ 106/31.29 |
| 4,758,276 | 7/1988 | Lin et al. ............ 106/31.35 |
| 4,820,346 | 4/1989 | Nowak ............ 564/169 |
| 5,000,786 | 3/1991 | Matsuzaki ............ 106/31.3 |
| 5,106,676 | 4/1992 | Sato et al. ............ 428/212 |
| 5,124,719 | 6/1992 | Matsuzaki ............ 349/88 |
| 5,624,483 | 4/1997 | Fujioka ............ 106/31.29 |

FOREIGN PATENT DOCUMENTS

| | | |
|---|---|---|
| 0 737 727 A2 | 10/1996 | European Pat. Off. |
| A-58-108271 | 6/1983 | Japan |
| A-59-22973 | 2/1984 | Japan |
| A-61-83268 | 4/1986 | Japan |
| A-62-48774 | 3/1987 | Japan |
| A-62-29597 | 12/1987 | Japan |
| A-2-167373 | 6/1990 | Japan |
| A-7-278477 | 10/1995 | Japan |
| WO96/15201 | 5/1996 | WIPO |

*Primary Examiner*—Terrel Morris
*Assistant Examiner*—John J. Guarriello
*Attorney, Agent, or Firm*—Oliff & Berridge, PLC

[57] ABSTRACT

A hot-melt solid ink composition comprises at least one polyamide and at least one terpene resin. The terpene resin is present in an amount of from 0.5% by weight to 15% by weight based on the total weight of the ink composition. This hot-melt solid ink composition can be stable to heat upon recording using ink-jet recording apparatus where ink is heated to melt at a temperature higher than ordinary temperature to make a record, and has a superior transparency and a superior adhesion to printing mediums.

21 Claims, 1 Drawing Sheet

HOT-MELT SOLID INK COMPOSITION

BACKGROUND OF THE INVENTION

1. Field of the Invention

This invention relates to an ink composition which is solid at ordinary temperature and melts upon heating, i.e., what is called a hot-melt solid ink composition. More particularly, it relates to a hot-melt solid ink composition which is stable to heat upon recording using ink-jet recording apparatus where ink is heated to melt at a temperature higher than ordinary temperature to make a record, and has a superior transparency and a superior adhesion to printing mediums.

2. Description of the Related Art

In conventional ink-jet recording systems, water-based inks employing water as a main solvent and oil-based inks employing an organic solvent as a main solvent are commonly used. Printed images obtained using the water-based inks have a poor water resistance in general. On the other hand, the oil-based inks can provide printed images having a good water resistance.

However, these water-based inks and oil-based inks are liquid at ordinary temperature, and so quickly permeate in recording paper when printed that feathering tends to occur and it has been difficult to attain a sufficient print density. Also, since the inks are liquid all the time, deposits such as aggregates of dyes tend to occur in ink during its storage, and such deposits may. e.g., stop up ink channels or ejection orifices to cause a great lowering of the reliability of ink-jet recording systems.

In order to overcome such disadvantages of the conventional inks of a solution type, what is called hot-melt oil-based ink-jet recording ink compositions, which are solid at ordinary temperature and melt upon heating, are proposed. Stated specifically, U.S. Pat. No. 3,653,932 discloses an ink containing a dialkyl sebacate. U.S. Pat. No. 4.390,369 and Japanese Patent Application Laid-open No. 58-108271 disclose an ink containing a natural wax. Japanese Patent Application Laid-open No. 59-22973 discloses an ink containing a stearic acid. Japanese Patent Application Laid-open No. 61-83268 discloses an ink containing an acid or alcohol having 20 to 24 carbon atoms and also containing a ketone having a relatively higher melting point than these. Japanese Patent Application Laid-open No. 62-48774 discloses an ink containing a thermosetting resin having a high hydroxyl value, a solid organic solvent having a melting point higher than 150° C. and a small quantity of a dye substance. Japanese Patent Application Laid-open No. 2-167373 discloses an ink comprised of a colorant, a first solvent which is solid at ordinary temperature and capable of liquefying upon heating to a temperature higher than the ordinary temperature and a second solvent capable of dissolving the first solvent, being liquid at ordinary temperature and being highly volatile. Also, Japanese Patent Application Laid-open No. 62-295973 discloses an ink containing a synthetic wax having a polar group and a dye soluble in the wax.

These hot-melt solid ink compositions are set in hot-melt ink-jet recording apparatus, made liquid upon heating, ejected from ejection mechanisms in the liquid state, and applied on printing mediums to make prints. However, the conventional hot-melt solid ink compositions have had the problems that the ink itself may discolor when left in a molten state for a long time, and, especially in the case of color inks colored in vivid colors, the colors may blacken and the initial vivid colors can not be maintained, having a poor thermal stability. Such problems tend to become more serious as they have a higher melt temperature and are left for a longer time.

In hot-melt ink-jet recording systems in which such hot-melt solid ink compositions are used, the time after signals are sent at the time of printing and before the printing is started is desired to be as short as possible, and in recent years much more strongly so desired. Accordingly, even in the state of a stand-by of ink-let printers, it is desirable for the ink to stand heated and to have been heated up to ink ejection temperature, because images can be immediately printed as soon as the signals are sent. However, it is not desirable for the conventional hot-melt solid ink compositions to be left for a long time while they stand heated up to the ejection temperature, because the ink tends to discolor as stated above. Accordingly, in the conventional hot-melt solid ink compositions, the ink is kept at a temperature lower than the ejection temperature in the state of a stand-by of hot-melt ink-jet printers, and must be heated up to the ejection temperature before the printing is started after the signals are received, thus it has taken a time.

None of the above hot-melt solid ink compositions have a good adhesion to printing mediums such as paper and OHP (overhead projector) sheets while retaining light transmission properties (transparency) of the ink itself after the ink has once melted, formed printed images and solidified. For example, the conventional ink compositions have a problem that, when images are printed OHP sheets that transmit light and have a poor ink permeability, the ink may crystallize in the course where it is cooled to solidify, so that the ink itself results in lack of light transmission properties and also the ink may come off when the OHP sheets are bent or rubbed with the hand.

SUMMARY OF THE INVENTION

The present invention was made in order to solve the above problems. Accordingly, an object of the present invention is to provide a hot-melt solid ink composition for ink-jet printers, that is stable to heat, may hardly discolor even when left for a long time while being heated up to the vicinity of ejection temperature, and also has both a good adhesion to printing mediums such as OHP sheets and superior light transmission properties.

To achieve this object, the present invention provides a hot-melt solid ink composition, comprising at least one polyamide and at least one terpene resin, said terpene resin being present in an amount of from 0.5% to 15% by weight based on the total weight of the ink composition.

This and other objects, features and advantages of the present invention are described in or will become parent from the following detailed description of the invention.

DETAILED DESCRIPTION OF THE INVENTION

Figure 1:
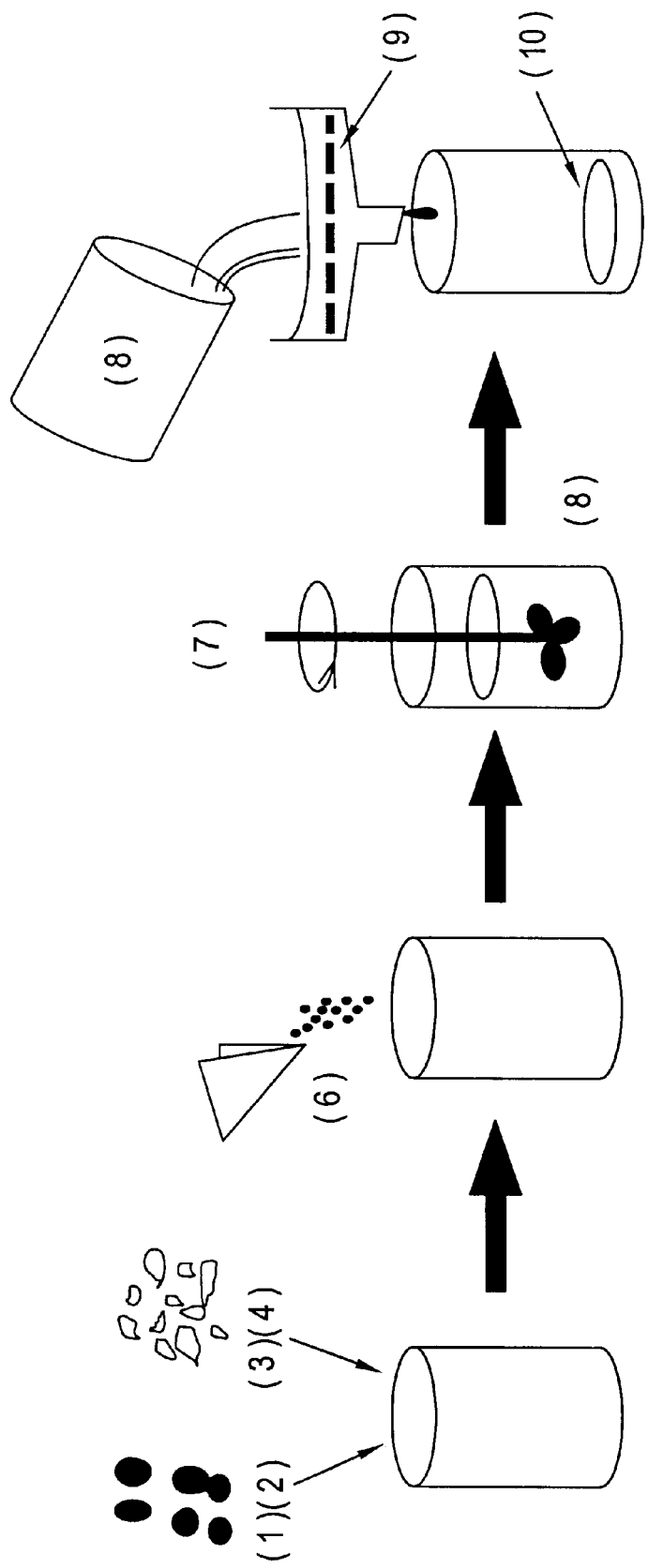
FIG. 1 illustrates a process for preparing the hot-melt solid ink composition of the present invention.

The hot-melt solid ink composition of the present invention which is solid at ordinary temperature and melts upon heating when used in the ink-jet printer, is characterized by containing at least one polyamide and at least one terpene resin, and the terpene resin is present in an amount of from 0.5% to 15% by weight based on the total weight of the ink composition. The hot-melt solid ink composition of the present invention further contains a wax and a colorant.

The hot-melt solid ink composition of the present invention has a melting point in the range of from 50° C. to 200°

C. more preferably from 60° C. to 150° C. and a melt viscosity of from 10 cps to 60 cps, more preferably from 10 to 40 cps, at from 100° C. to 140° C.

If having a melting point lower than 5° C., the hot-melt ink composition can be less advantage as a hot-melt ink. If higher than 200° C., the ejection mechanism also must be set at a higher temperature in order to completely melt the hot-melt solid ink composition, and hence there is a possibility that the ejection mechanism becomes less durable.

The reason why the melt viscosity of the hot-melt ink composition is preferably adjusted within the range of from 10 cps to 60 cps is to prevent faulty ejection and clogging of ink-jet heads. If its viscosity is higher than this range, the hot-melt solid ink composition may behave not as a fluid but as a semisolid even if pressure waves or the like are generated in ink nozzles, resulting in ejection of ink not in a proper quantity or no ejection of ink at all. Also if the melt viscosity is lower than this range, the hot-melt solid ink composition can not be well ejected.

The hot-melt solid ink composition of the present invention, when printing is made using the hot-melt solid ink composition on a transparent printing medium such as OHP sheets, can shows superior light transmission properties, preferably a haze of 0 to 30 and a superior adhesion to the transparent printing medium.

In the hot-melt solid ink composition of the present invention, the total content of the polyamide resin and the terpene resin may be preferably from 10% to 65% by weight, more preferably from 30% to 50% by weight, based on the total weight of the ink composition. If the total content is less than 10%, the ink performances (such as a melt viscosity, light transmission properties and an adhesion to OHP sheets) of the hot-melt solid ink composition becomes insufficient. If the total content is more than 65%, the melt viscosity becomes too high, resulting in clogging of ink-jet heads.

The polyamide resin, terpene resin and wax used in the present invention may each preferably have a melting point in the range of from 50° C. to 200° C. and more preferably from 60° C. to 150° C., whereby the melting point of the hot-melt solid ink composition can be adjusted within the range of 50 to 200° C.

In the present invention, the polyamide resin and the terpene resin as well as the wax are each used as one of vehicles. Of these, the polyamide resin is relatively unstable to heat, and is considered to oxidize to undergo a change in color, or discolor, when left for a long time at a high temperature of about melt temperature. Such a change in color due to polyamide resin can be prohibited by adding a terpene resin to the ink composition. Moreover, even when a terpene resin is added to the ink composition, the terpene resin has so good a compatibility with other vehicles that it does not inhibit the function inherent in the polyamide resin, i.e., the function to, e.g., endow the ink composition with an adhesion to printing paper and also prevent the wax from its crystallization to impart transparency to the ink composition, and that it does not inhibit the function inherent in the wax, i.e., the function to, e.g., endow the ink composition with the thermal properties and viscosity suited for its ejection by ink-jetting. Hence, the addition of the terpene resin by no means damages the fundamental performances of ink (transparency of ink, sharpness of color, etc.) and the good print quality.

The polyamide resin used in the present invention is obtained by condensation polymerization of an amine and an acid. As the amine, hexamethylenediamine may be used, for example. As the acid, adipic acids sebacic acid, trimellitic anhydride or a dimer acid may be used, for example. Also, as those having both the amine and the acid, there are 11-amino undecanoic acid and 12-amino dodecanoic acid. Any of these may be used in combination to thereby control a polyamide resin having the desired properties (amine value, acid value). As specific examples of commercially available polyamide resins usable in the present invention, they may include, e.g., the following: TOHMIDE 90, TOHMIDE 92, TOHMIDE 391, TOHMIDE 394, TOHMIDE 394N, TOHMIDE 395, TOHMIDE 397, TOHMIDE 509, TOHMIDE 535, TOHMIDE 558, TOHMIDE 560, TOHMIDE 575, TOHMIDE 1310, TOHMIDE 1350 (trade names: all available from Fuji Kasei Kogyo Co., Ltd.), POLYMIDE S-40HA, POLYMIDE S-40E, POLYMIDE S-150, POLYMIDE S-52, POLYMIDE S-185, POLYMIDE S-1510, POLYMIDE S-1525, POLYMIDE S-1635, POLYMIDE S-1962, POLYMIDE S-2007, POLYMIDE S-2153 (trade names; all available from Sanyo Chemical Industries, Ltd.), VERSAMID 335, VERSAMID 725, VERSAMID 744, VERSAMID 756, VERSAMID 930 and VERSAMID 940 (trade names; all available from Henkel Hakusui Corporation). In the present invention, any of these may be used alone or may be used in the form of a mixture of tow or more.

In the present invention, the polyamide resin may preferably be used in such an amount that the total of polyamide resin is in the range from 5 to 50% by weight, and more preferably from 10 to 30% by weight, based on the total weight of the ink composition. If the polyamide resin in the ink composition is in a content less than 5% by weight, not only the melt viscosity high enough to eject ink in ink-jet recording systems can not be well achieved, but also the transparency of ink and the adhesion to printing mediums can not be ensured. On the other hand, if the content of the polyamide resin in the ink composition is more than 50% by weight, the ink composition may have so an excessively high melt viscosity that it becomes difficult to well eject ink at the operating temperature of printer heads used in ink-jet recording, and also that the ink may poorly soak into paper when applied onto paper, where the ink may come off the paper when the print surfaces are rubbed with the hand or the like and no good print quality can be well maintained.

The terpene resin used in the present invention refers to a polyterpene, which typically includes a terpene-phenol copolymer. As specific examples of the terpene resin, it includes YS RESIN PX1250, YS RESIN PX1150, YS RESIN PX1000, YS RESIN TO0125, YS RESIN TO115, YS RESIN TO105, CLEARON P125, CLEARON P115, CLEARON P105, CLEARON M115 and CLEARON M105 (trade names; available from Yasuhara Chemical Co., Ltd.). As specific examples of the terpene-phenol copolymer, it includes YP-90L, YS POLYSTAR 2130, YS POLYSTAR 2115, YS POLYSTAR 2100, YS POLYSTAR T145, YS POLYSTAR T130, YS POLYSTAR T115 and YS POLYSTAR T100 (trade names; available from Yasuhara Chemical Co., Ltd.). In the present invention, any of these may be used alone or may be used in the form of a mixture of tow or more.

In the present invention, as stated above, the terpene resin is used in such an amount that the total of terpene resin is in the range from 0.5 to 15% by weight based on the total weight of the ink composition. If the terpene resin in the ink composition is in a content less than 0.5% by weight, the present invention can not be well effective, e.g., the ink composition tends to discolor in a heat molten state. If it is in a content ore than 15% by weight, the performances inherent in ink an not be well exhibited, e.g., the ink composition has poor transparency and a higher melt viscosity. Taking account of print quality when printed by printers, the terpene resin in the ink composition may more preferably be in a content of from 2 to 10% by weight, and more preferably from 3 to 8% by weight. The effect of the present invention such as prevention of discoloration has been found to be remarkable especially when the terpene-phenol copolymer is used.

In the present invention, as the wax, waxes having a melting point of about 50° C. to 200° C. as stated above and stable to heat may be used. Stated specifically, such a wax may include conventional known waxes such as petroleum waxes, preferably paraffin wax or microcrystalline wax; vegetable waxes, preferably candelilla wax, carnauba wax, rice wax or jojoba solid wax; animal waxes, preferably beeswax, lanolin or spermaceti; mineral waxes, preferably montan wax; synthetic hydrocarbon waxes, preferably Fischer-Tropsh wax or polyethylene wax; hydrogenated waxes, preferably hardened castor oil or hardened castor oil derivatives; modified waxes, preferably montan wax derivatives, paraffin wax derivatives, microcrystalline wax derivatives or polyethylene wax derivatives; fat-and-oil type synthetic waxes (e.g., higher fatty acid or the like), preferably behenic acid, stearic acid, palmitic acid, myristic acid or lauric acid; ketone waxes, preferably distearyl ketone; higher alcohol, preferably stearyl alcohol or behenyl alcohol; hydroxystearic acids, preferably 12-hydroxystearic acid or 12-hydroxystearic acid derivatives; and fatty acid amides including lauric acid amide, stearic acid amide, oleic acid amide, erucic acid amide, ricinolic acid amide, stearic acid ester amide, palmitic acid amide, behenic acid amide, brassidic acid amide, N-oleylstearic acid amide, N-stearylstearic acid amide, N-oleylpalmitic acid amide and N-stearylerucic acid amide; as well as ketones, preferably stearone or laurone; amines, preferably dodecylamine, tetradecylamine or octadecylamine; esters, preferably methyl stearate, octadecyl stearate, glycerol fatty acid ester, sorbitan fatty acid ester, propylene glycol fatty acid ester, ethylene glycol fatty acid ester or polyoxyethylene fatty acid ester; and polymer waxes, preferably α-olefin-maleic anhydride copolymer wax; any of which may be used without any particular limitations. Any of these waxes may be used alone or in the form of a mixture of two or more.

The wax described above may preferably be used in such an amount that the total of wax is in the range from 20 to 90% by weight, more preferably from 30% to 70% by weight, based on the total weight of the hot-melt solid ink composition. If the wax in the hot-melt ink composition is in a content less than 20% by weight, properties of other additives may come out overall and hence the ink composition may have a too high melting point to tend to make the ink composition not sharply melt at ink-jet ejection temperature. If the wax is in a content more than 90% by weight, the ink composition may have less transparency and have a too low melt viscosity, so that the melt viscosity high enough for the ink composition to function as an ink for ink-jet recording can be achieved with difficulty and also the ink composition may have a too low adhesion to OHP sheets.

As the colorant used in the present invention, any dyes or pigments conventionally used in oil-based ink compositions may be used. As to the pigments, those commonly used in the technical field of printing may be used without regard to organic or inorganic. Stated specifically, the pigments may include conventional known pigments as exemplified by carbon black, cadmium red, molybdenum red, chromium yellow, cadmium yellow, titanium yellow, chromium oxide, viridian, titanium cobalt green, ultramarine blue, Prussian blue, cobalt blue, azo pigments, phthalocyanine pigments, quinacridone pigments, isoindolinone pigments, dioxadine pigments, threne pigments, perylene pigments, perynone pigments, thioindigo pigments, quinopthalone pigments, and metal complex pigments, any of which may be used without any particular limitations so long as they have a primary particle size in the range of from 10 to 100 μm. Any of these pigments may be used in combination.

As to the dyes, any dyes conventionally used in oil-based ink compositions may be used, and may preferably include oil-soluble dyes such as azo dyes, disazo dyes, metal complex dyes, naphthol dyes, anthraquinone dyes, indigo dyes, carbonium dyes, quinoneimine dyes, cyanine dyes, quinoline dyes, nitro dyes, nitroso dyes, benzoquinone dyes, naphthoquinone dyes, xanthene dyes, phthalocyanine dyes, and metal phthalocyanine dyes. Any of these dyes may be used in combination.

In the present invention, either of the dye and the pigment may be used as the colorant, but it is preferable to use a soluble dye having a good thermal stability and a good solubility in other vehicles. Any of these colorants may preferably be contained in the ink composition in an amount of from 0.1% to 10% by weight in order for the ink composition to have a sufficient color forming performance, more preferably from 0.5% to 8% by weight taking account of color forming performance when printed by printers, and still more preferably from 1% to 5% by weight in order to ensure not to cause the deposition of dye or aggregation of pigment from the ink composition that may be caused by thermal changes when printers are operated.

The vehicles used in the present invention and other vehicles and additives optionally used are all solid at ordinary temperature. Accordingly, when the hot-melt solid ink composition of the present invention is prepared, it is necessary to melt all of them at a temperature higher than their melt temperatures to well mix and uniformly disperse them. So long as such an object can be achieved, there are no particular limitations on the means for preparing the hot-melt solid ink composition of the present invention, and any desired means may be used.

A procedure for producing the hot-melt solid ink composition of the present invention will be described with reference to the accompanying drawing, FIG. 1. The respective vehicles (1), (3) and (4) used in the present invention and other vehicles and additives optionally used are charged into a container (5), the former being in the proportions as previously described and the latter being in the proportions within such ranges that do not damage the performance of the hot-melt solid ink composition of the present invention, and are melted by heating at a temperature higher than the highest melt temperature among the melt temperatures of the vehicles and other additives optionally used, usually at a temperature of from 70 to 250° C., and preferably form 100 to 200° C., in approximation, and then a colorant (6) is charged. After the vehicles and other additives optionally used have been melted, a stirrer (7) is rotated at a rotational speed and for a time, high and long enough to obtain a uniform mixture, usually from 200 to 10,000 rpm, and preferably from 500 to 5,000 rpm, and usually from tens of minute to several hours, and preferably from 1 to 2 hours, to thoroughly stir and mix the mixture. The stirring and mixing are carried out until no agglomerate remains as confirmed on an optical microscope (about 200 magnifications), taking a drop of the mixture on its slide glass. After the stirring and mixing are completed, the resultant mixture (8) is put in a filtering apparatus in a molten state to effect filtration.

Non-uniform substances are filtered off, and the substance having passed through a filter (9) is collected as a final hot-melt solid ink composition (10).

As described above, because of the incorporation of the terpene resin in the hot-melt solid ink composition of the present invention, the ink can retain the fundamental performances required as hot-melt solid ink compositions for ink-jet printers and a good print quality, and may hardly discolor even when left for a long time while being heated up to the vicinity of ejection temperature. Also, since it becomes possible for the ink to be left for a long time as it is heated up to the vicinity of ejection temperature, printing can be started immediately after signals for printing are received while the ink is kept at ejection temperature in the state of a stand-by of the hot-melt ink-jet printer, thus it takes no time when printed after the stand-by.

Moreover, the present ink composition shows a good adhesion to printing mediums such as OHP sheets and superior light transmission properties, preferably a haze of from 0 to 30.

When the polyamide resin, terpene resin and wax used in the present invention each have a melting point of from 50 to 200° C., the ink composition itself also shows a melting point within that range. Hence, the melt viscosity of from 10 to 60 cps is attained at a temperature of from 100 to 140° C. at which the ink melts, so that the ability to well eject ink in ink-jet printer systems can be exhibited, i.e., the ability to eject a stated quantity of ink in a preset direction without causing clogging of nozzles with ink.

EXAMPLES

The present invention will be specifically described below by giving Examples.

Example 1

YP-90L (trade name; available from Yasuhara Chemical Co., Ltd.) as a terpene-phenol copolymer, VERSAMID 335 (trade name; available from Henkel Hakusui Corporation) as a polyamide resin, NIKKAMIDE S (trade name; stearic acid amide available from Nippon Kasel Chemical Co., Ltd.) as a fatty acid amide and ketone wax KAO WAX T-1 (available from Kao Corporation) as a wax were charged into an apparatus in the following quantities, and were heat melted at a temperature of 130° C., and then NEOPEN YELLOW 075 (trade name; an oil-soluble dye available from BASF Corp.) was charged. These were stirred and mixed by means of a dissolver at 1,000 rpm for about 1 hour. A drop of the resultant mixture was taken on a slide glass and observed using an optical microscope (200 magnifications) to make sure that no agglomerate was present. The mixture thus obtained was filtered by means of a heat filtering apparatus manufactured by Toyo Roshi K.K., using a 0.8 μm glass fiber filter GA200 (available from Toyo Roshi K.K.). The mixture having passed the filter was obtained as a hot-melt solid ink composition.

| | |
|---|---|
| YP-90L | 5 parts by weight |
| VERSAMID 335 | 37 parts by weight |
| NIKKAMIDE S | 13 parts by weight |
| KAO WAX T-1 | 43 parts by weight |
| NEOPEN YELLOW 075 | 2 parts by weight |

The hot-melt solid ink composition thus obtained was melted on a hot plate heated to 110° C., and then coated on an OHP (overhead projector) sheet (PP-2500, available from Sumitomo 3M Limited) using a wire-wound rod (winding wire diameter: 0.9 mm), followed by colorimetry using a colorimeter manufactured by Suga Shikenki. This hot-melt solid ink composition was further left for 10 days in a container kept constant at 125° C., and thereafter coated on an OHP sheet in the same manner as the above, followed by colorimetry to make comparison with the one initially conditioned. As a result, color difference ΔE was 10.07.

The hot-melt solid ink composition left for 10 days at 125° C. was set in an ink-jet printer to print images. As a result, sharp printed images free of darkish color were obtained without causing any clogging of the printer head.

Example 2

Using the same components as described in Example 1, used in the following quantities, the procedure as described in Example 1 was repeated to obtain a hot-melt solid ink composition.

| | |
|---|---|
| YF-90L | 10 parts by weight |
| VERSAMID 335 | 32 parts by weight |
| NIKKAMIDE S | 16 parts by weight |
| KAO WAX T-1 | 40 parts by weight |
| NEOPEN YELLOW 075 | 2 parts by weight |

On the hot-melt solid ink composition thus obtained, the same procedure as the one described in Example 1 was taken for the colorimetry to compare its color with the one initially conditioned. As a result, color difference ΔE was 3.06.

The hot-melt solid ink composition left for 10 days at 125° C. was set in an ink-jet printer to print images. As a result, sharp printed images free of darkish color were obtained without causing any clogging of the printer head.

Comparative Example 1

Using VERSAMID 335 as a polyamide resin, NIKKAMIDE S as a fatty acid amide, ketone wax KAO WAX T-1 as a wax and NEOPEN YELLOW 075 as a colorant, used in the following quantities, the procedure as described in Example 1 was repeated to obtain a hot-melt solid ink composition.

| | |
|---|---|
| VERSAMID 335 | 43 parts by weight |
| NIKKAMIDE S | 13 parts by weight |
| KAO WAX T-1 | 42 parts by weight |
| NEOPEN YELLOW 075 | 2 parts by weight |

On the hot-melt solid ink composition thus obtained, the same procedure as the one described in Example 1 was taken for the colorimetry to compare its color with the one initially conditioned. As a result, color difference ΔE was 42.39.

The hot-melt solid ink composition left for 10 days at 125° C. was set in an ink-jet printer to print images. As a result, only printed images with darkish color, lack in color sharpness, were obtained.

Comparative Example 2

Using VERSAMID 335 as a polyamide resin, NIKKAMIDE S as a fatty acid amide, SLIPACKS O (stearic acid wax available from Nippon Kasei Chemical Co., Ltd.) and behenic acid wax (DAIAMID B90) as waxes, DIACARNA PA30L (trade name; available from Mitsubishi Chemical Industries Limited) as an α-olefin-maleic anhydride copolymer and NEOPEN YELLOW 075 as a colorant, used in the following quantities, the procedure as described in Example 1 was repeated to obtain a hot-melt solid ink composition.

| | |
|---|---|
| VERSAMID 335 | 28 parts by weight |
| NIKKAMIDE S | 20 parts by weight |
| SLIPACKS O | 10 parts by weight |
| DAIAMID B90 | 10 parts by weight |
| DIACARNA PA30L | 10 parts by weight |
| NEOPEN YELLOW 075 | 2 parts by weight |

On the hot-melt solid ink composition thus obtained, the same procedure as the one described in Example 1 was taken for the colorimetry to compare its color with the one initially conditioned. As a result, color diff erence ΔE was 33.61.

The hot-melt solid ink composition left for 10 days at 125° C. was set in an ink-jet printer to print images. As a result, only printed images with darkish color, lack in color sharpness, were obtained.

Comparative Example 3

Using the same components as described in Comparative Example 2, used in the following quantities, the procedure as described in Example 1 was repeated to obtain a hot-melt solid ink composition.

| | |
|---|---|
| VERSAMID 335 | 28 parts by weight |
| NIKKAMIDE S | 15 parts by weight |
| SLIPACKS O | 33 parts by weight |
| DAIAMID B90 | 15 parts by weight |
| DIACARNA PA30L | 7 parts by weight |
| NEOPEN YELLOW 075 | 2 parts by weight |

On the hot-melt solid ink composition thus obtained, the same procedure as the one described in Example 1 was taken for the colorimetry to compare its color with the one initially conditioned. As a result, color difference ΔE was 35.22.

The hot-melt solid ink composition left for 10 days at 125° C. was set in an ink-jet printer to print images. As a result, only printed images with darkish color, lack in color sharpness, were obtained.

As is clear from the foregoing, compared with the hot-melt solid ink compositions obtained in Comparative Examples 1 to 3, the hot-melt solid ink compositions obtained in Examples 1 and 2 maintained sharp printed images with less discoloration and free of darkish color even after they were left for a long time at melt temperature.

Example 3

Using YP-90L as a terpene-phenol copolymer, VERSAMID 335 as a polyamide resin, NIKKAMIDE S and Fatty Acid Amide P (palmitic acid amide available from Kao Corporation) as fatty acid amides and NEOPEN YELLOW 075 as a colorant, used in the following quantities, the procedure as described in Example 1 was repeated to obtain a hot-melt solid ink composition.

| | |
|---|---|
| YP-90L | 15 parts by weight |
| VERSAMID 335 | 25 parts by weight |
| NIKKAMIDE S | 38 parts by weight |
| Fatty Acid Amide P | 20 parts by weight |
| NEOPEN YELLOW 075 | 2 parts by weight |

The hot-melt solid ink composition thus obtained was melted on a hot plate heated to 110° C., and then coated on an OHP sheet (PP-2500, available from Sumitomo 3M Limited) using a wire-wound rod (winding wire diameter: 0.9 mm) to form an ink film which was sharp in color and transparent. Its haze was measured using a hazometer (manufactured by Suga Shikenki K.K.) to find to be 19.8. Melt viscosity of this ink composition was also measured using a viscometer (manufactured by Brookfield Co.) to find to be 39.8 cps at 125° C.

The above ink composition was set in an ink-jet printer to print images. As a result, sharp prints were obtained without causing any clogging of the printer head, showing a good adhesion onto the recording paper. Also, when images were printed on ink-impermeable, light-transmitting printing mediums such as OHP sheets and thereafter the back of print surface was rubbed or the printing mediums were warped by applying thereto a stress such as bend, the hot-melt solid ink composition of the present invention retained a sufficient adhesion to the printing medium without coming off the printing medium, while conventional hot-melt solid ink compositions easily came off; and also had sufficient light transmission properties.

Example 4

Using YS RESIN PX1250 (trade name; available from Yasuhara Chemical Co., Ltd.) as a terpene resin, TOHMIDE 92 (trade name; available from Fuji Kasei Kogyo Co., Ltd.) as a polyamide resin, NIKKAMIDE OP (trade name; oleyl palmitic acid amide available from Nippon Kasei Chemical Co., Ltd.) as a fatty acid amide, DIACARNA PA30 (trade name; available from Mitsubishi Chemical Industries Limited) as an α-olefin-maleic anhydride copolymer and NEOPEN BLUE B808 (trade name; an oil-soluble dye available from BASF Corp.) as a colorant, used in the following quantities, the procedure as described in Example 1 was repeated to obtain a hot-melt solid ink composition.

| | |
|---|---|
| YS RESIN PX1250 | 10 parts by weight |
| TOHMIDE 92 | 25 parts by weight |
| NIKKAMIDE OP | 58 parts by weight |
| DIACARNA PA30 | 5 parts by weight |
| NEOPEN BLUE 808 | 2 parts by weight |

The hot-melt solid ink composition thus obtained was coated on an OHP sheet in the same manner as described in Example 3, and the haze was measured using a hazometer (manufactured by Suga Shikenki K.K.) to find to be 19.8. where an ink film which was sharp in color and transparent was formed. Melt viscosity of this ink composition was also measured using a viscometer (manufactured by Brookfield Co.) to find to be 27.5 cps at 125° C.

The above ink composition was set in an ink-jet printer to print images. As a result, sharp prints were obtained without causing any clogging of the printer head, showing a good adhesion onto the recording paper. Also, when images were printed on OHP sheets and thereafter the back of print surface was rubbed or the printing mediums were warped by applying thereto a stress such as bend, the hot-melt solid ink composition of the present invention retained a sufficient adhesion to the printing medium without coming off the printing medium, while conventional hot-melt solid ink compositions easily came off; and also had sufficient light transmission properties.

Comparative Example 4

Using VERSAMID 335 as a polyamide resin, NIKKAMIDE OP as a fatty acid amide, DIACARNA PA30L (trade name; available from Mitsubishi Chemical Industries Limited) as an α-olefin-maleic anhydride copolymer and NEOPEN BLUE 808 as a colorant, used in the following quantities, the procedure as described in Example 1 was repeated to obtain a hot-melt solid ink composition.

| | |
|---|---|
| VERSAMID 335 | 20 parts by weight |
| NIKKAMIDE OP | 58 parts by weight |
| DIACARNA PA30L | 20 parts by weight |
| NEOPEN BLUE 808 | 2 parts by weight |

The hot-melt solid ink composition thus obtained was coated on an OHP sheet in the same manner as described in Example 3, and thereafter the back of coat surface was rubbed or the printing medium was warped by applying thereto a stress such as bend, where the coat easily came off. Melt viscosity of this ink composition was also measured using a viscometer (manufactured by Brookfield Co.) to find to be 20.2 cps at 125° C. but the haze measured using a hazometer (manufactured by Suga Shikenki K.K.) was found to be 53.5. When images were printed on the OHP sheet, an ink film lacking in transparency was formed. Its adhesion was examined in the same manner as described in Example 3. As a result, the ink film came off and no sufficient adhesion to the OHP sheet was attained.

Comparative Example 5

Using VERSAMID 335 as a polyamide resin, DAIAMID O-200 (trade name; crude oleic acid amide available from Nippon Kasei Chemical Co., Ltd.) as a fatty acid amide, WAX OP (trade name; montanic acid partially saponified ester wax available from Hoechist Japan Ltd.) and NEOPEN YELLOW 075 as a colorant, used in the following quantities, the procedure as described in Example 1 was repeated to obtain a hot-melt solid ink composition

| | |
|---|---|
| VERSAMID 335 | 28 parts by weight |
| DAIAMID O-200 | 40 parts by weight |
| WAX OP | 30 parts by weight |
| NEOPEN YELLOW 075 | 2 parts by weight |

The hot-melt solid ink composition thus obtained was coated on an OHP sheet in the same manner as described in Example 3, and thereafter the back of coat surface was rubbed or the printing medium was warped by applying thereto a stress such as bend, where the coat easily came off. Melt viscosity of this ink composition was also measured using a viscometer (manufactured by Brookfield Co.) to find to be 24.2 cps at 125° C., but the haze measured using a hazometer (manufactured by Suga Shikenki K.K.) was found to be 33.5. When images were printed on the OHP sheet, an ink film lacking in transparency was formed. Its adhesion was examined in the same manner as described in Example 3. As a result, like the above Comparative Example 4. no sufficient adhesion to the OHP sheet was attained.

Comparative Example 6

Using YP-90L (trade name; available from Yasuhara Chemical Co., Ltd.) as a terpene resin, DAIAMID O-200 as a fatty acid amide, NIKKAMIDE S as a fatty acid amide, DIACARNA PA30L as an α-olefin-maleic anhydride copolymer and NEOPEN YELLOW 075 as a colorant, used in the following quantities, the procedure as described in Example 1 was repeated to obtain a hot-melt solid ink composition.

| | |
|---|---|
| YP-90L | 28 parts by weight |
| DAIAMID O-200 | 10 parts by weight |
| NIKKAMIDE S | 33 parts by weight |
| DIACARNA PA30L | 20 parts by weight |
| NEOPEN YELLOW 075 | 2 parts by weight |

The hot-melt solid ink composition thus obtained was coated on an OHP sheet in the same manner as described in Example 3, and thereafter the back of coat surface was rubbed or the printing medium was warped by applying thereto a stress such as bend, where the coat easily came off. Melt viscosity of this ink composition was also measured using a viscometer (manufactured by Brookfield Co.) to find to be 19.4 cps at 125° C., but the haze measured using a hazometer (manufactured by Suga Shikenki K.K.) was found to be 63.6. When images were printed on the OHP sheet, an ink film lacking in transparency was formed. Its adhesion was examined in the same manner as described in Example 3. As a result, like the above Comparative Example 4, no sufficient adhesion to the OHP sheet was attained.

As is clear from the foregoing, compared with the hot-melt solid ink compositions obtained in Comparative Examples 4 to 6, the hot-melt solid ink compositions obtained in Examples 3 and 4 have a good adhesion to printing mediums and a transparency suited for OHPs.

The entire disclosures of Japanese Patent Application Nos. 8-310757 and 9-94511 including the specifications, claims, summaries and drawings are herein incorporated by reference in their entireties.

What is claimed is:

1. A hot-melt solid ink composition, comprising a wax, a colorant, at least one polyamide resin and at least one terpene resin, said terpene resin being present in an amount of from 0.5% to 15% by weight based on the total weight of the ink composition.

2. The hot-melt solid ink composition according to claim 1, having a melting point in the range of from 50° C. to 200° C. and a melt viscosity of from 10 cps to 60 cps at from 100° C. to 140° C.

3. The hot-melt solid ink composition according to claim 2, wherein said polyamide resin and terpene resin each have a melting point of from 50° C. to 200° C.

4. The hot-melt solid ink composition according to claim 1, wherein, when a printed image is made using said hot-melt solid ink composition on a transparent printing medium, said printed image has a light transmission property and adheres to the transparent printing medium.

5. The hot-melt solid ink composition according to claim 1, wherein the light transmission property means a haze of 0 to 30.

6. The hot-melt solid ink composition according to claim 1, wherein said terpene resin is a terpene-phenol copolymer.

7. The hot-melt solid ink composition according to claim 1, wherein said terpene resin is present in an amount of from 3% to 8% by weight based on the total weight of the ink composition.

8. The hot-melt solid ink composition according to claim 1, wherein said polyamide resin is obtained by condensation polymerization of an amine and an acid.

9. The hot-melt solid ink composition according to claim 8, wherein said amine is hexamethylenediamine and said acid is adipic acid, sebacic acid, trimellitic anhydride or a dimer acid.

10. The hot-melt solid ink composition according to claim 1, wherein said polyamide obtained by condensation polymerization of 11-amino undecanoic acid or 12-amino dodecanoic acid.

11. The hot-melt solid ink composition according to claim 1, wherein said polyamide is present in an amount of from 5% to 50% by weight based on the total weight of the ink composition.

12. The hot-melt solid ink composition according to claim 11, wherein said polyamide is present in an amount of from 10% to 30% by weight based on the total weight of the ink composition.

13. The hot-melt solid ink composition according to claim 1, wherein the total content of the polyamide resin and terpene resin is from 10% to 65% by weight based on the total weight of the ink composition.

14. The hot-melt solid ink composition according to claim 13, wherein the total content of the polyamide resin and terpene resin is from 30% to 50% by weight based on the total weight of the ink composition.

15. The hot-melt solid ink composition according to claim 1, wherein the wax has a melting point in the range of from 50° C. to 200° C.

16. The hot-melt solid ink composition according to claim 1, wherein said wax is selected from the group consisting of petroleum waxes; vegetable waxes; animal waxes; mineral waxes; synthetic hydrocarbon waxes; hydrogenated waxes; montan wax derivatives; paraffin wax derivatives; microcrystalline wax derivatives; polyethylene wax derivatives; higher fatty acid waxes; ketone waxes; higher alcohol; hydroxystearic acids; fatty acid amides; ketones; amines; esters; and polymer waxes.

17. The hot-melt solid ink composition according to claim 1, wherein said wax is present in an amount of from 20% to 90% by weight based on the total weight of the ink composition.

18. The hot-melt solid ink composition according to claim 17, wherein said wax is present in an amount of from 30% to 70% by weight based on the total weight of the ink composition.

19. The hot-melt solid ink composition according to claim 1, wherein said colorant is present in an amount of from 0.1% to 10% by weight based on the total weight of the ink composition.

20. The hot-melt solid ink composition according to claim 19, wherein said colorant is present in an amount of from 1% to 5% by weight based on the total weight of the ink composition.

21. A hot-melt solid ink composition, comprising a wax, a colorant, at least one polyamide resin and at least one terpene resin, said terpene resin being present in an amount of from 0.5% to 15% by weight based on the total weight of the ink composition, and said polyamide resin being present in an amount of from 5% to 50% by weight based on the total weight of the ink composition, wherein the total content of the polyamide resin and the terpene resin is from 10% to 65% by weight based on the total weight of the ink composition, and wherein, when a printed image is made using said hot-melt solid ink composition on a transparent printing medium, said printed image has a light transmission property and adheres to the transparent printing medium.

* * * * *